(12) United States Patent
Ishikawa et al.

(10) Patent No.: US 7,362,477 B2
(45) Date of Patent: Apr. 22, 2008

(54) IMAGE READER

(75) Inventors: Yoshiro Ishikawa, Takatsuki (JP);
Hirotaka Chiba, Kawasaki (JP);
Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1050 days.

(21) Appl. No.: 10/445,023

(22) Filed: May 27, 2003

(65) Prior Publication Data

US 2003/0231355 A1    Dec. 18, 2003

(30) Foreign Application Priority Data

May 31, 2002 (JP) .............................. 2002-160586

(51) Int. Cl.
*H04N 1/04* (2006.01)
(52) U.S. Cl. ...................... 358/473; 358/474; 358/483; 358/442
(58) Field of Classification Search ................ 358/473, 358/472, 442, 474, 468, 483, 482, 512–514, 358/505; 382/313, 312; 250/234–236, 208.1, 250/216, 239
See application file for complete search history.

(56) References Cited

U.S. PATENT DOCUMENTS

| | | | | |
|---|---|---|---|---|
| 5,963,343 A | * | 10/1999 | Kubo et al. ................. | 358/473 |
| 6,744,537 B1 | * | 6/2004 | Chiba et al. ................. | 358/473 |
| 6,886,749 B2 | * | 5/2005 | Chiba et al. ............ | 235/472.01 |
| 6,965,862 B2 | * | 11/2005 | Schuller ...................... | 704/258 |
| 6,978,939 B2 | * | 12/2005 | Russell et al. .......... | 235/472.01 |
| 7,133,168 B2 | * | 11/2006 | Cheung et al. .............. | 358/497 |
| 2002/0193141 A1 | * | 12/2002 | Wu .............................. | 455/556 |
| 2002/0196477 A1 | * | 12/2002 | Chen ........................... | 358/474 |
| 2003/0151780 A1 | * | 8/2003 | Tsai ............................. | 358/474 |
| 2005/0111056 A1 | * | 5/2005 | Chiba et al. ................. | 358/474 |
| 2006/0284987 A1 | * | 12/2006 | Wolf, II .................... | 348/220.1 |

FOREIGN PATENT DOCUMENTS

| | | |
|---|---|---|
| JP | 3-53760 | 3/1991 |
| JP | 05-130321 | 5/1993 |
| JP | 06-111061 | 4/1994 |
| JP | 07-283910 | 10/1995 |
| JP | 10-283910 | 10/1995 |

* cited by examiner

*Primary Examiner*—Cheukfan Lee
(74) *Attorney, Agent, or Firm*—Staas & Halsey LLP

(57) ABSTRACT

An image reader, detachably attached to an electronic apparatus, for functionally expanding the electronic apparatus and for reading an image on a medium, includes an interface connectible to and disconnectible from the electronic apparatus a housing having an image-reading surface that faces the medium, a medium detecting part, provided on the image-reading surface, for detecting the medium, and an image reading part, provided on the image-reading surface and driven based on a detection result by the medium detecting part, for reading the image on the medium.

12 Claims, 17 Drawing Sheets

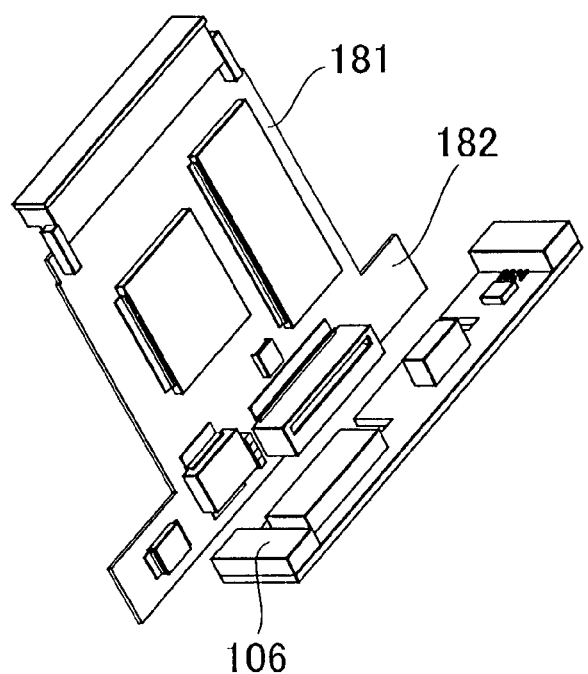
F I G. 14A
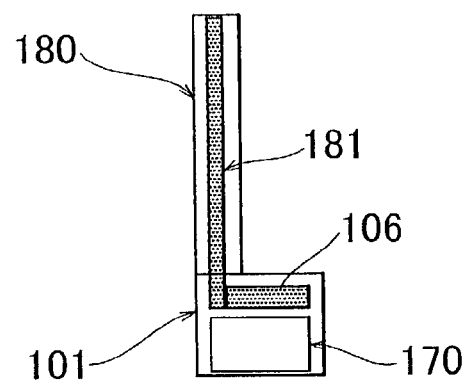
F I G. 14B
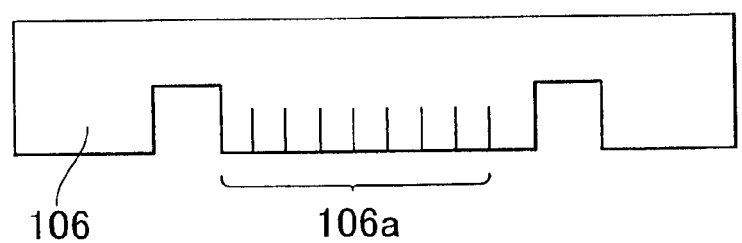
F I G. 14C

IMAGE READER

BACKGROUND OF THE INVENTION

The present invention relates generally to electronic apparatuses, and more particularly an electronic peripheral. The present invention is suitable, for example, for an image pick-up device for functionally expanding a portable information terminal, such as a personal digital assistant ("PDA").

Scanners as a device for reading an image on a medium have conventionally been widely known, and miniature scanners have been proposed suitable for portability. A portable scanner, different from other peripherals, such as a digital camera, requires a user to move the scanner on the medium, and thus is demanded to provide good operability, e.g., smooth scan movements and easy read control operations. Known portable scanners include one connected to a personal computer (referred to as a "PC" hereinafter) through a cable and a stand-alone type that has a memory to store an image in the device.

However, the cable in the cable connection type hinders smooth operations, while the stand-alone type requires a computer to view obtained images and is awkward to handle. A portable scanner serves only as a scanner, and is hard to catch up with the recent multifunctional trend of portable terminals.

Accordingly, the instant inventors have addressed a small and portable information terminal that has functions similar to the PC. The recent development of electronic apparatuses, such as a PDA, has promoted smaller, lower profile and lighter miniature and portable information terminals, such as a PDA, to enhance its portability. In addition, a method for functionally expanding a portable terminal in accordance with users' preferences by providing the portable terminal with a compact flash ("CF") (card) slot and PC (card) slot so as to make the portable terminal multifunctional. When the scanner part is connected to the PDA through an interface such as a CF slot, the console part, memory, and indicator on the PDA may become available and the power may become supplied from the PDA. The cable may be omitted by using the CF card, and the obtained image may be confirmed as image data on site. For example, Japanese Laid-Open Patent Application No. 7-283910 discloses an image reader including a PC card and a scanner.

However, since it has not yet been contemplated that a scanner part is inserted though a CF card, etc. into a conventional PDA, a user cannot always obtain the expected operability. For example, the PDA itself is a long in the perpendicular direction, and the CF slot is often adapted to be inserted into the PDA from the top. In addition, the PDA typically has a console part at its lower portion. Consequently, when the CF card with a scanner function is inserted into the PDA, the scanner part is located at the top while the console part is located at the lower portion. In use, the scanner part is pressed onto the medium by holding the device up side down, and thus the scanner part is located at the bottom while the console part is located at the upper portion. When a portion near the scanner part is held so as to smoothly move the scanner part along the medium, the user should release his hand from the holding part and operate the console part to start and stop reading, since the holding part is apart from the console part. Thus, disadvantageously, the conventional device has bad operability. The instant inventors have found that a mere combination of the scanner part and CF card, etc. would be insufficient.

BRIEF SUMMARY OF THE INVENTION

Accordingly, it is a general object of the present invention to provide an image reader with good operability.

In order to achieve these and other objects, an image reader, detachably attached to an electronic apparatus, for functionally expanding the electronic apparatus and for reading an image on a medium includes an interface connectible to and disconnectible from the electronic apparatus, a housing having an image-reading surface that is to face the medium, a medium detecting part, provided on the image-reading surface, for detecting the medium, and an image reading part, provided on the image-reading surface and driven based on a detection result by the medium detecting part, for reading the image on the medium. This image reader enables the image reading part to start and stop reading based on the detection result by the medium detecting part for automatic driving of the image reading part without any operation of the electronic apparatus. Therefore, a user may obtain desired operability even when the console part and holding part are arranged apart from each other in the electronic apparatus.

The medium detecting part may be an optical switch, such as an optical reflection type photo interrupter, for driving said image reading part, thereby detecting the medium in a non-contact manner.

The image reader may further include a reinforcing member detachably provided between the housing and the electronic apparatus, and made of an elastic material. The elastic material is preferable because the image reader does not always have a flat surface facing the electronic apparatus. The image reader may further include a plurality of reinforcing members to be detachably provided between the housing and the electronic apparatus and made of an elastic material, each reinforcing member having a different width in a direction from the housing to the electronic apparatus, wherein one of the plurality of reinforcing members which fits an interval between the housing and the electronic apparatus being selected and inserted between the housing and the electronic apparatus. For example, when the electronic apparatus is a PDA, a slot depth for connection with an interface, such as a CF card, differs for each product. In an attempt to make the inventive image reader compatible with plural types of electronic apparatuses manufactured by different manufacturers, the interface should fit the deepest slot depth. Then, an aperture occurs between the housing and the electronic device with a shallow slot depth. Then, this aperture may undesirably apply a bending stress to the interface and vibrate the housing. Accordingly, the present invention enables the housing to always contact the electronic apparatus through an elastic reinforcing member provided between the housing and the electronic apparatus. A preparation of plural reinforcing members each having a different thickness would provide the image reader with compatibility with different products.

The image reading part may read the image through a read window formed on the image-reading surface extending in a longitudinal direction of the image-reading surface, the read window being formed and decentered in a forward read direction of the image on the image-reading surface. The read window that is biased towards the forward read direction would enable the device to easily be located at a position to be read. In particular, in reading a center foldable position in a book, the image reader may read a portion closer to the center of the book than that having a read window at the center on the image-reading surface.

The image reader may further include a pair of main rollers rotatably provided on side surfaces perpendicular to the image-reading surface on said housing, and an auxiliary roller attached to said image-reading surface. A plurality of auxiliary rollers are preferably provided to maintain the image-reading surface parallel to the medium, and facilitate the smooth scan. The image reader may further include a shaft, accommodated in said housing, for pivoting said auxiliary roller. The shaft that does not expose from the housing would not negatively affect the reading action.

The image reading part includes a read window formed on the image-reading surface extending in a longitudinal direction of the image-reading surface, and wherein said image reader may further include a pair of main rollers rotatably provided in said housing, and a projection member, provided on the image-reading surface, for correcting distortion of the medium, said projection member inclining in a forward read direction of the image. Thereby, even when the image-reading surface inclines with respect to an axis that connects a pair of main rollers, the projection member is provided with a taper part that prevents part of the projection member from contacting the medium and hindering movements of the main rollers.

An image reader of another aspect of the present invention includes an image reading part for reading an image on a medium, a rotary encoder for detecting a moving distance of said image reading part, a controller for controlling readout timing of the image by said image reading part in accordance with a detection result of said rotary encoder, wherein said rotary encoder includes a scaler including a plurality of lines that are patterned at a regular interval on a curved surface, and a reflection type optical sensor for optically recognizing the lines on the scaler. This rotary encoder may has higher resolution per rotation than that using a slit plate. The image reader may further include a pair of main rollers rotatably provided in said housing that accommodates said image reading part, and a shaft for connecting said pair of main rollers, wherein said scaler is fixed onto said shaft and rotates with said shaft. An integral combination of the scaler and main rollers easily transmits a rotation of the roller to the scaller, simplifying the structure of the encoder. The scaler includes, for example, a cylindrically curved surface on which the lines are formed, or a hollow ring shape having a curved surface on which the lines are formed, and the main roller has a boss part with which the scaler is engaged. When the hollow ring scaler is integrated with the main rollers, the arrangement that mounts the scaler at the boss part of the roller would facilitate an integration between the scaler and main rollers. The scaler may include a hollow ring shape having an inner curved surface on which the lines are formed, and the optical detecting part may be located at a hollow part in said scaler. Such a structure may miniaturize the image reader.

The image reader may further include a first base for forming said interference, and a second base, fixed perpendicular to said first base, for forming said image reading part. Such a structure may shorten the height direction of the image reader, and realize a smooth scan movement with to a low center of gravity.

An image reader of another aspect of the present invention, detachably attached to an electronic apparatus, for functionally expanding the electronic apparatus by providing the electronic apparatus with an image reading function, and for reading an image on a medium includes a housing having an image-reading surface that is to face the medium, an image reading part, provided on the image-reading surface, for reading the image on the medium, a pair of main rollers rotatably provided on a pair of side surfaces perpendicular to the image-reading surface on said housing, and a shaft, provided in said housing, for connecting said pair of main rollers. This image reader arranges the main rollers at both ends of the housing through the shaft, making thin the roller and shortening the length of the image reader in the read direction. The shaft that fixes two rollers may synchronize rotations of these rollers, and mitigate meander in scanning. In addition, only one encoder for measuring the rotation is enough.

Preferably, the shaft perforates the image reading part. This may provide a smaller structure than an arrangement that arranges the rollers and shaft while avoiding the image reading part.

The shaft may have the same uniform diameter in a longitudinal direction. In assembling the shaft in the image reading part, it is conceivable to provide steps for rollers' positions. When the image reading part is unitized, it is necessary to reassemble the image reader after the control board for the image reading part is disassembled. However, this would cause the image reading part to break and deteriorate its performance of the image reading part and thus it is preferable to avoid a disassembly of the image reading part. The shaft having the same diameter over its span would prevent the image reading part from being disassembled since the shaft may be inserted into the housing from its side surface.

The main roller may include a plurality of projections at a side of said housing. The shaft with the same uniform diameter over its span cannot fix a roller position using bearings near the shaft, and becomes in an idle state in its longitudinal direction. Since the strict size would increase cost, the rotation of the rollers deteriorate due to friction resulting from a contact between the rollers and housing. A plurality of projections provided on a surface of the roller lower the friction even when there is a contact between the main roller and the housing because the contact becomes point contacts. As a result, the tolerance of the arrangement between the main roller and the housing may be made larger.

The image reader may further include an auxiliary roller attached to the image-reading surface on said housing. A plurality of auxiliary rollers are preferably provided to maintain the image-reading surface parallel to the medium, and facilitate the smooth scan. The image reader may further include a shaft, accommodated in said housing, for pivoting said auxiliary roller. The shaft that does not expose from the housing would not negatively affect the reading action.

Other objects and further features of the present invention will become readily apparent from the following description of the embodiments with reference to accompanying drawings.

BRIEF DESCRIPTION OF THE DRAWINGS

FIG. 14 is an exploded perspective view of the image reader shown in FIG. 1.

DETAILED DESCRIPTION OF THE INVENTION

Figure 1:
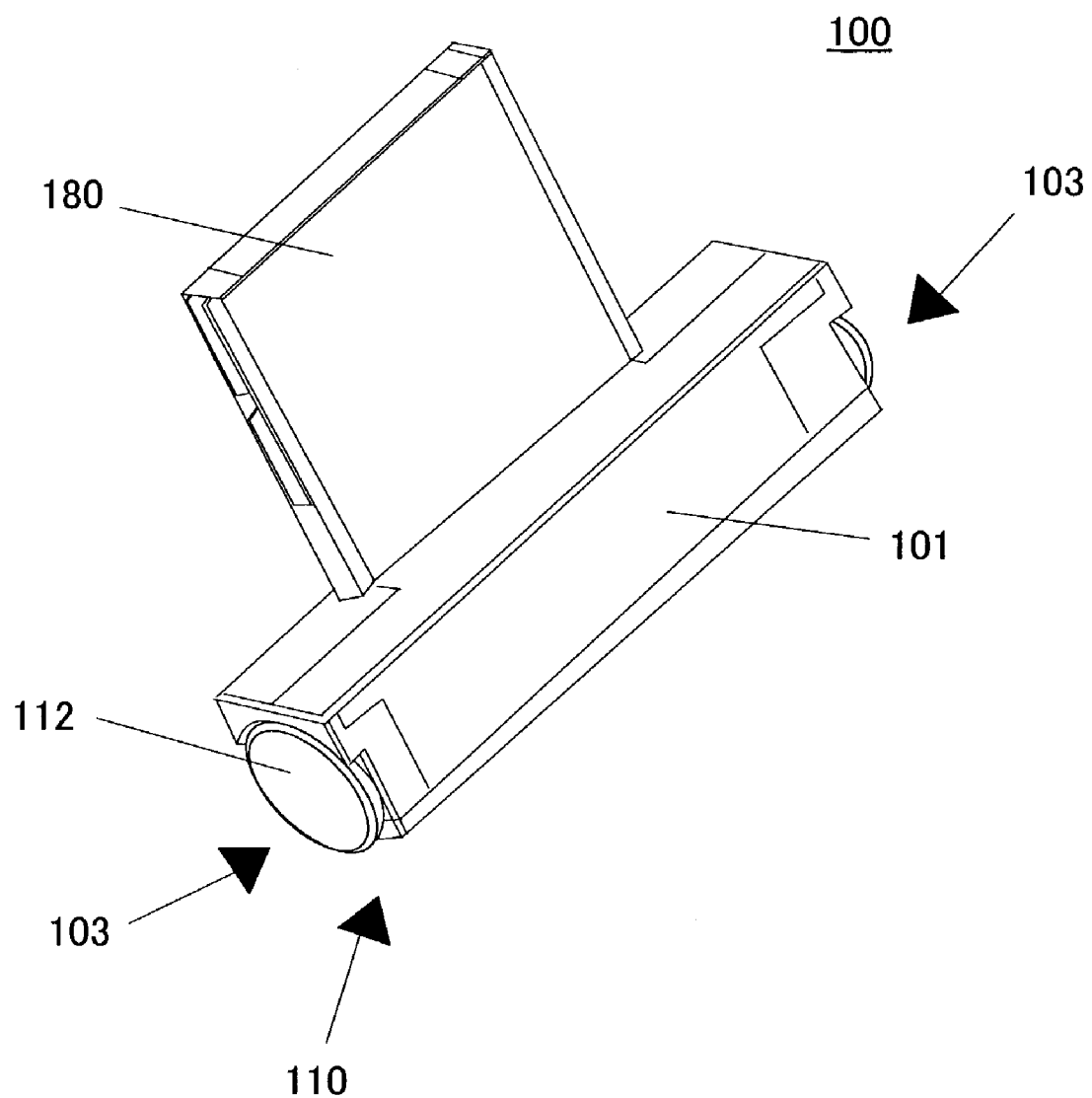
FIG. 1 is a perspective overview of an image reader of one embodiment according to the present invention.
Figure 2:
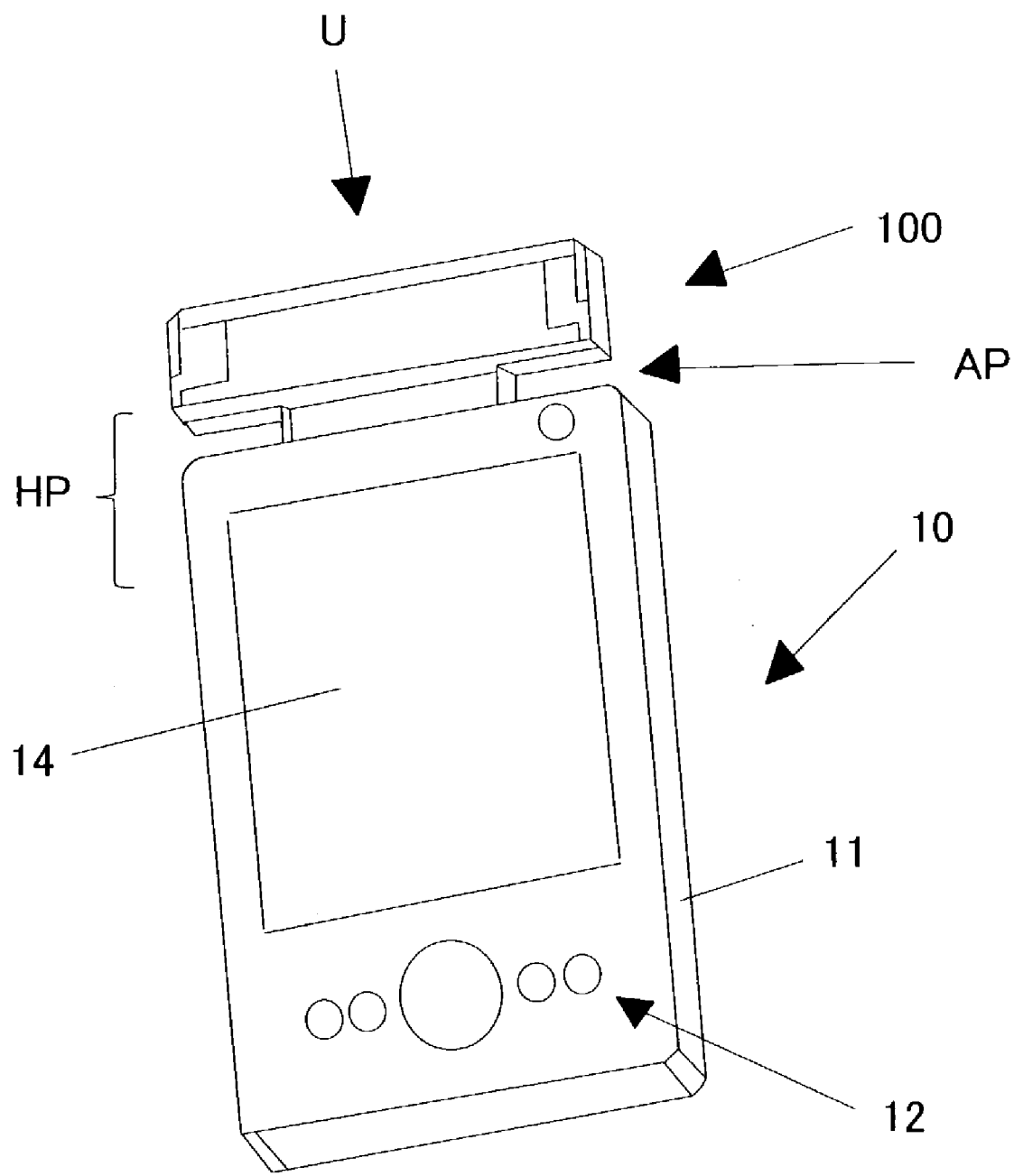
FIG. 2 is a perspective overview of the image reader shown in FIG. 1 mounted on a PDA as an exemplary electronic apparatus.
Figure 3:
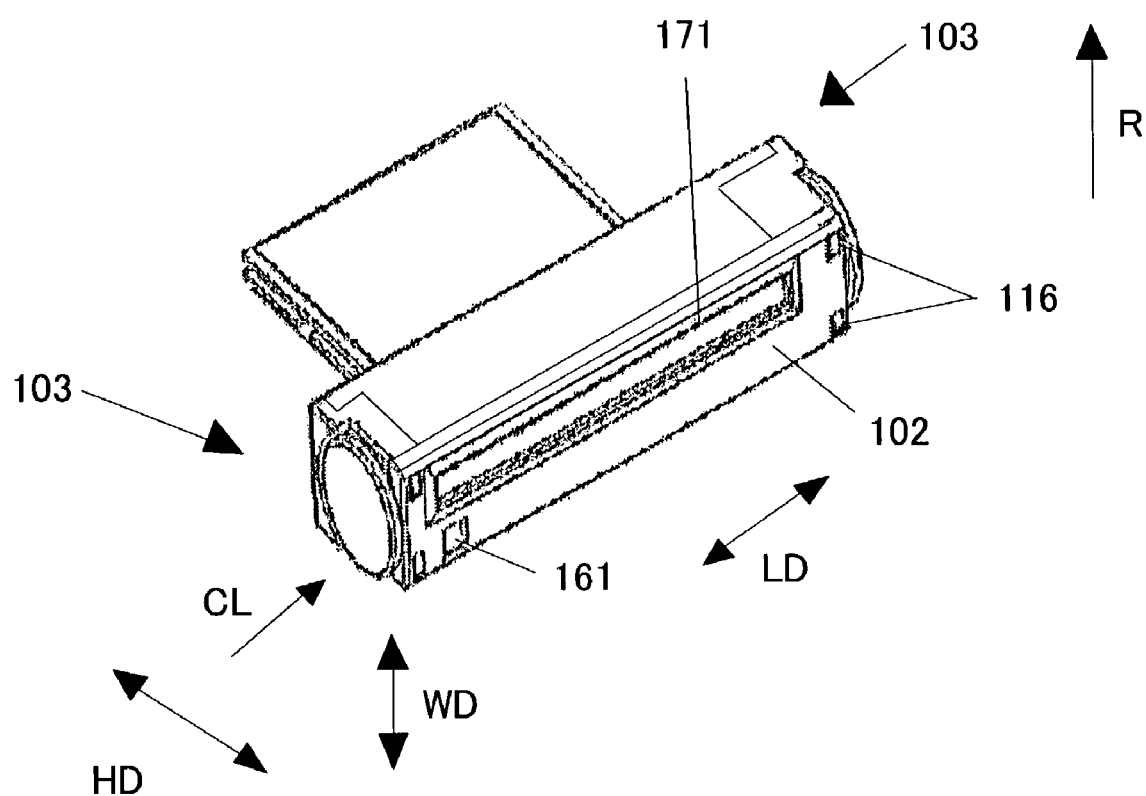
FIG. 3 is another perspective overview of the image reader shown in FIG. 1.

Referring now to accompanying drawings, a description will be given of an image reader 100 of one embodiment according to the present invention. Here, FIG. 1 is a perspective overview of the image reader 100. FIG. 2 is a perspective overview of the image reader 100 mounted on a PDA 10 as an exemplary electronic apparatus. FIG. 3 is another perspective overview of the image reader 100.

Although the instant embodiment uses the PDA 10 as a typical example of the electronic apparatus, electronic apparatuses to which the present invention is applicable include a hand-held PC, palm sized PC, wearable computer, portable electronic apparatus, portable terminal, etc., and its size covers a A4 size, a B5 size, a sub-notebook size, a mini-notebook size, etc.

The PDA 10 includes an approximately rectangular parallelopiped housing 11, a console part 12, a display part 14, a CF slot (not shown) provided on the rear surface of the housing 11, and a memory (not shown) accommodated in the housing 11 . The CF slot (not shown) is formed at the rear surface so that the CF card 180 may be inserted from the top in a direction U shown in FIG. 2.

If necessary, the PDA 10 may have a pen, a USB port, a radio communication antenna (not shown), a radio LAN card, a speaker, an Ir receiver, an outer microphone, a headphone connector, a radiator part, an AC adapter terminal, an IrDA port, a battery part, various pointing devices, a bluetooth modem, other connectors with peripherals, a security part of the device housing.

If necessary, the PDA 11 serves as a stand for maintaining a predetermined inclined orientation on a table or desk. The present invention does not prevent the PDA 10 from being detachably mounted on an optional dedicated support rack as a separate member.

The console part 12 includes various LEDs, a power switch, a reset switch, various control switches. The LFDs include lamps, for example, for indicating a battery volume, a connection status with the external power supply, a communication status, a status of the image reader 100, an access to the memory, an abnormality of the PDA 10, etc. The power switch is a switch used to power on and off the PDA 10. The reset switch is a switch used to resume the PDA 10. Various control switches enable a user to control the PDA 10 itself and the image reader 100, if necessary. Such control includes driving, scanning start and stop, display, storage, editing of image information.

The display part 14 includes, for example, an LCD. If necessary, the display part 14 is formed as a touch panel for indicating a plurality of electronic buttons and for inputting information into the PDA 10 using a finger or pen. The display part 14 may display various data including various control information to the PDA 10 and image reader 100, entry information, and Web information as well as image information sent from the image reader 100.

The console part 12 and display part 14 may use any techniques known in the art, and a detailed description thereof will be omitted. The memory (not shown) in the PDA stores image information received from the control part 107, which will be described later.

As shown in FIG. 2, before the image reader 100 is not installed onto the PDA 10, a user typically puts a rear surface near the console part 12 on the PDA 10 on his/her palm while placing the console part 12 down and the display part 14 up, and operates the console part 12 with his/her right hand. On the other hand, when the image reader 100 is mounted onto the PDA 10, the image reader 100 is positioned on a medium, such as a book and manuscript, while turning the PDA 10 in FIG. 1 up side down, and a user holds the PDA 10 with his hand. Therefore, it is understood that in using the image reader 100, the holding part is located near a part HP in PDA 10 in FIG. 2 apart from the console part 12.

The image reader 100 is one example of a functional expansion device, detachably attached to the electronic apparatus, for functionally expanding the electronic device, and this embodiment provides the PDA 10 with an image reading function to read out an image on a medium. Of course, some characteristics of the present invention are applicable to functional expansion devices other than the image reader, which include an image pick-up device, such as a digital camera, a GPS device, and a radio communication apparatus, such as a GPS. The image reader 100 of the instant embodiment includes a housing 100, a drive mechanism 110, a moving amount detecting part 140, a medium detecting part 160, an image reading part 170, and a CF card 180.

The housing 101 serves as a scanner, and has an approximately rectangular parallelopiped shape. The housing 101 includes an image-reading surface 102, a pair of side surface 103, and a PDA facing surface 104. The image-reading surface 102 is a surface that faces a medium, such as a book and manuscript. The image reading surface 102 is provided with four auxiliary rollers 116, a read window 171, a detector window 161. A concave portion is formed on each side surface 103, and a main roller 112 is engaged with the concave portion. The PDA facing surface 104 is a surface that faces the PDA 10.

Figure 6:
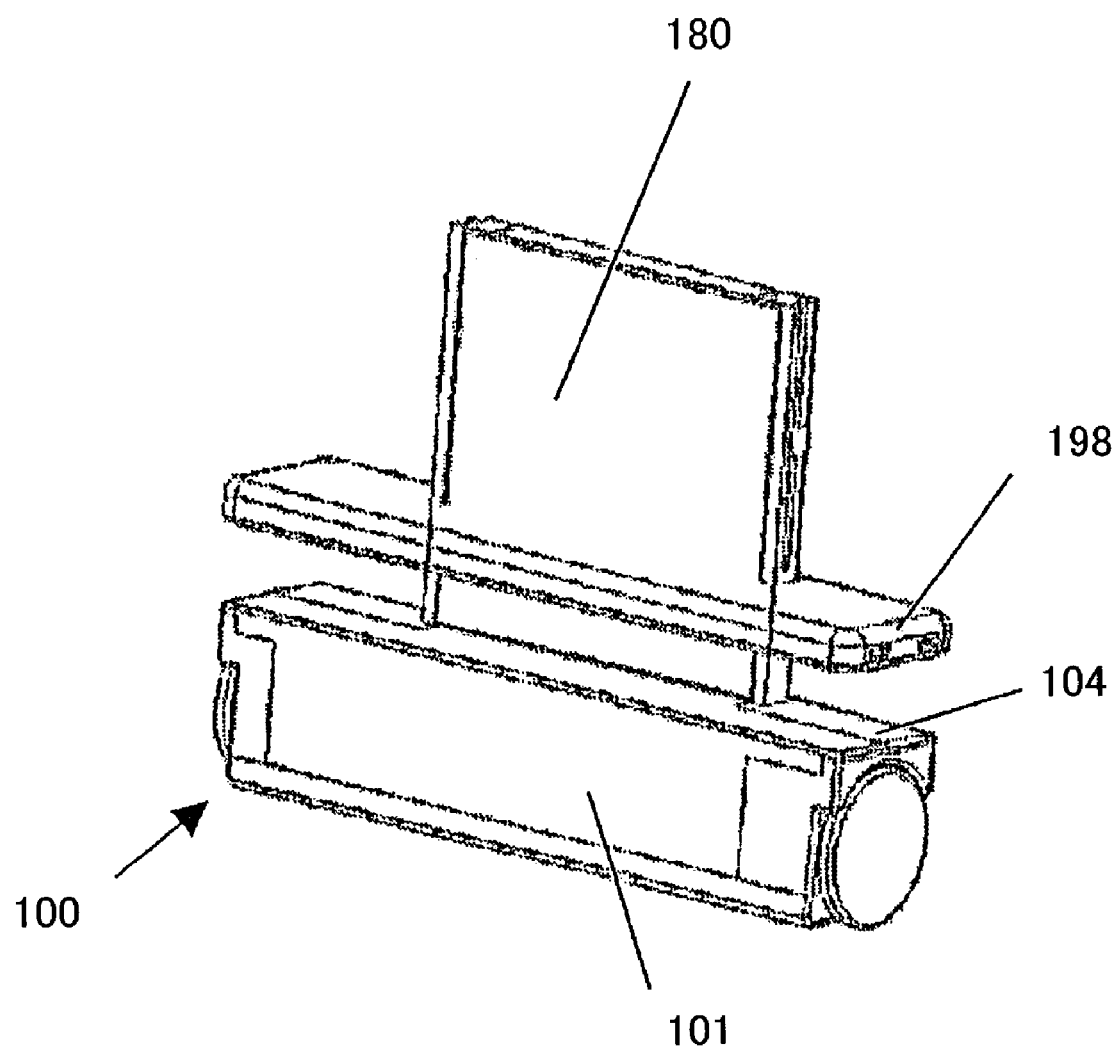
FIG. 6 is a perspective overview showing that a reinforcing member is being inserted into a CF card in the image reader shown in FIG. 1.

As shown in FIG. 6, a reinforcing member 198 made of an elastic material, such as rubber, is detachably provided between the housing 101 and the PDA 10. Here, FIG. 6 is a perspective overview showing that the reinforcing member 198 is being inserted into the CF card 180. The reinforcing member 198 finally contacts the PDA facing surface 104. The elastic material is used to absorb a shape change to some extent because the PDA facing surface 104 sometimes includes a curved surface and projections, such as body switches, and is not always flat. The instant embodiment enables the reinforcing member 198 to be detachably inserted into the aperture AP, but may fix it with adhesive agent.

The aperture AP shown in FIG. 2 may be eliminated when the CF card 180 is squeezed further, but remains depending upon device types of the PDA 10 to which the image reader 100 is connected. The reinforcing member 198 is located in the aperture between the PDA facing surface 104 on the housing 101 of the image reader 100 and the PDA 10, and serves to make the housing 101 contact with the PDA 10. Such an aperture AP would apply the bending stress to the CF card 180 and damage the CF card 180 in scan reading, since only the CF card 180 is located in the aperture. On the other hand, the PDAs 10 have different CF slot depths depending upon manufactures and the aperture distance changes depending upon device types. The instant embodiment make the image reader 100 compatible with a device type with the deepest CF slot in order to make the image reader 100 compatible with various device types. Then, the aperture AP of several mm, e.g., about 2 to 5 mm occurs between the PDA facing surface 104 and the PDA 10 for other devices types. Accordingly, plural reinforcing members each having a different thickness are prepared and one which corresponds to the aperture is selected for each device type, so as to make the image reader 100 compatible with multiple device types of PDAs 10.

The drive mechanism 110 is a mechanism for enabling the user to move the image reader 100 on the medium. The drive mechanism 110 includes a pair of rollers 112, a shaft for connecting the main rollers 112, four auxiliary rollers 116, and a pair of shafts 118 each for pivoting a pair of auxiliary rollers 116.

The main roller 112 serves to move the housing 101 on the medium, and the image-reading surface on the housing 101 projects in a medium direction, for example, by 0.5 mm. The main rollers 112 are rotatably provided on a pair of side surfaces 103 perpendicular to the image-reading surface 102 on the housing 101, and connected by the shaft 114. The rollers 112 may be made thin by arranging the main rollers at both sides of the housing 101 through the shaft 114. The image reader 100 may be made shorter in the direction R than the rollers arranged with the image reading part 170 in an image read (or scan) direction R. Such a low profile assists in equalizing the thickness of the PDA 10 to the thickness of the image reader 100.

Figure 15:
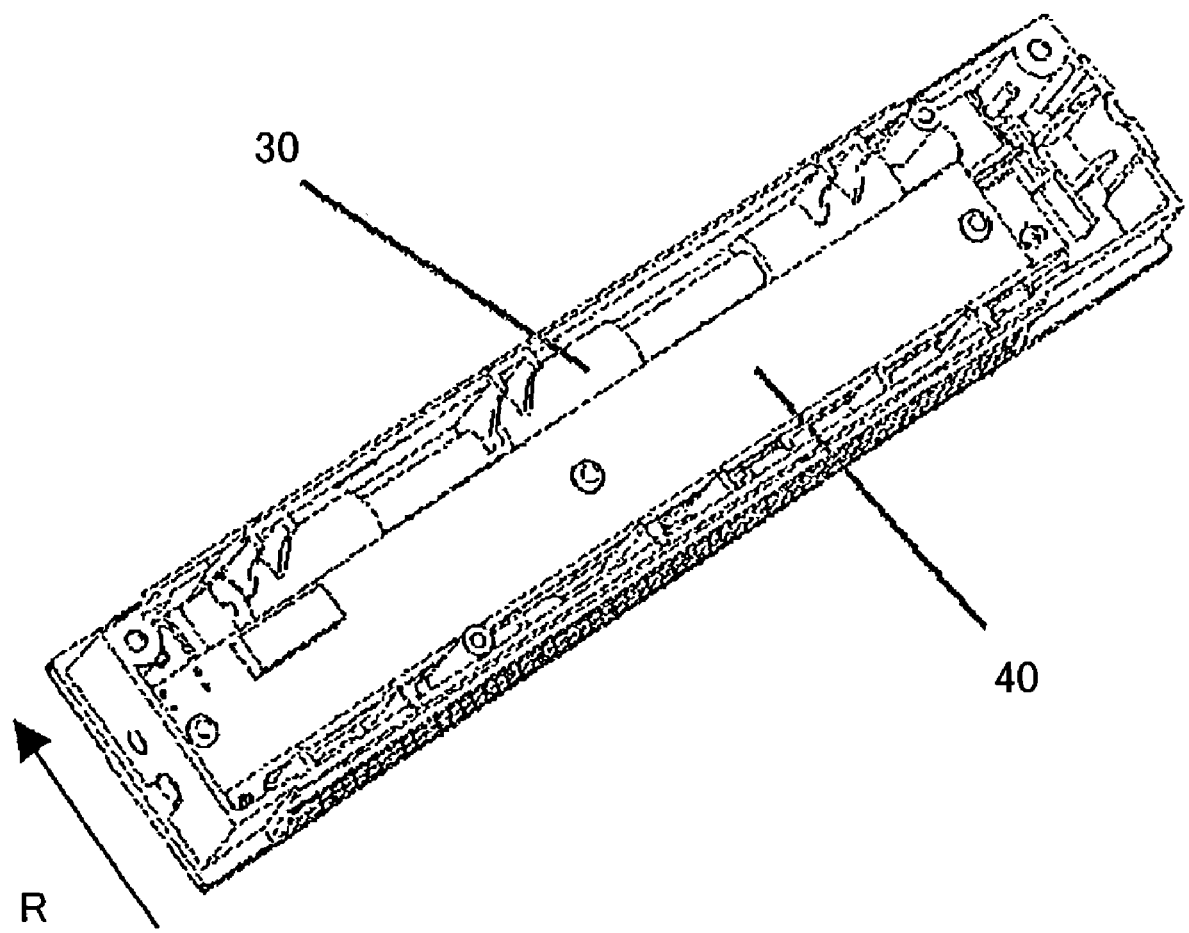
FIG. 15 is a perspective view showing a structure that arranges the roller and image sensor in parallel.
Figure 16:
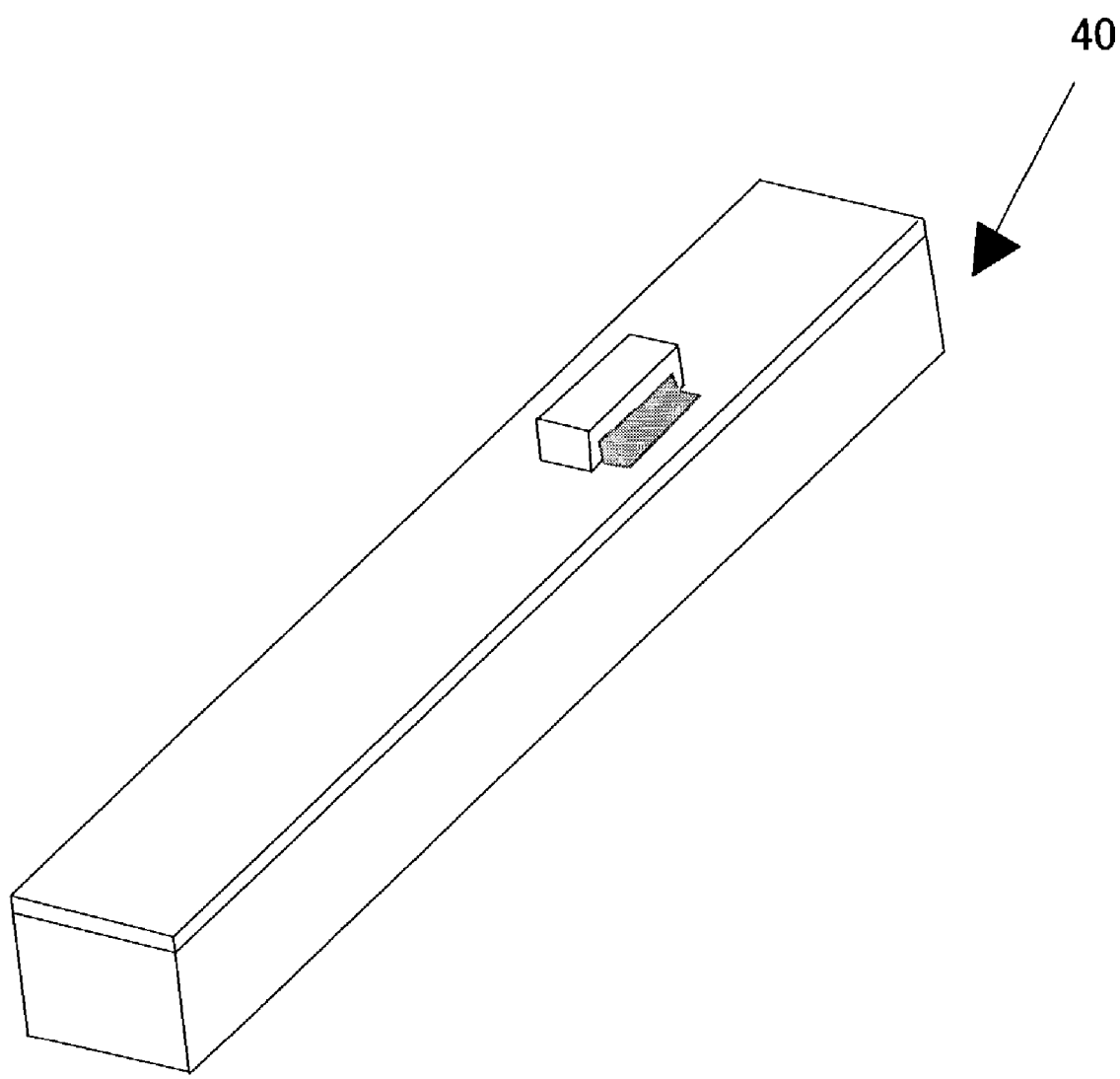
FIG. 16 is a perspective overview of the image sensor shown in FIG. 15.
Figure 17:
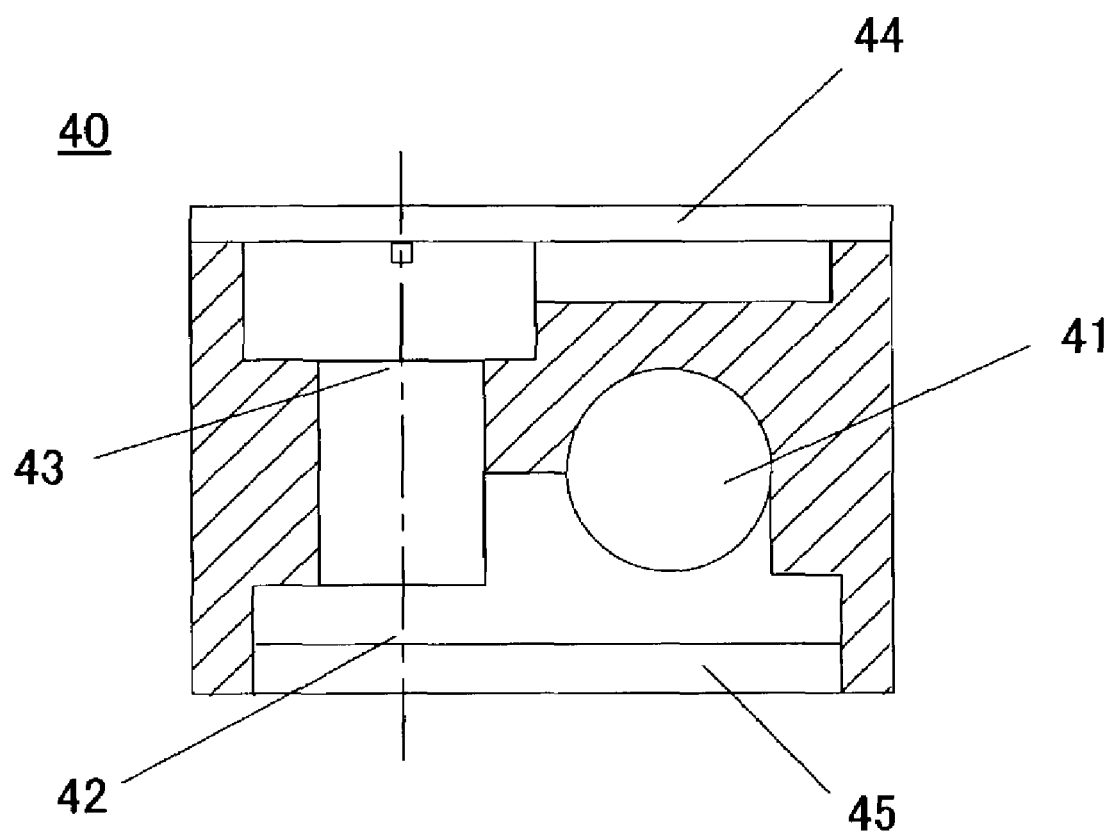
FIG. 17 is a sectional view of the image sensor shown in FIG. 15.

Consider, for example, that one or more rollers 30 are arranged with an image sensor unit 40 in the read direction R, as shown in FIG. 15. Here, FIG. 15 is a perspective view of the structure that arranges the rollers 30 and image sensor unit 40 in parallel. In addition, FIGS. 16 and 17, respectively, are a perspective overview and a sectional view of the image sensor unit 40. The image sensor 40 includes, as shown in FIGS. 16 and 17, a light source 41, a lens array 42 for imaging reflected light from the medium on a sensor surface, a sensor chip 43, such as a CCD, a control board 44 for processing and controlling signals from the sensor chip 43, and a transparent protective cover 45. The image sensor unit 40 is unitized and thus the rollers 30 should be arranged by avoiding the image sensor unit 40. For example, when the rollers 30 are arranged as shown in FIG. 15 the device size should be extended longer than the diameter of the roller 30.

Figure 7:
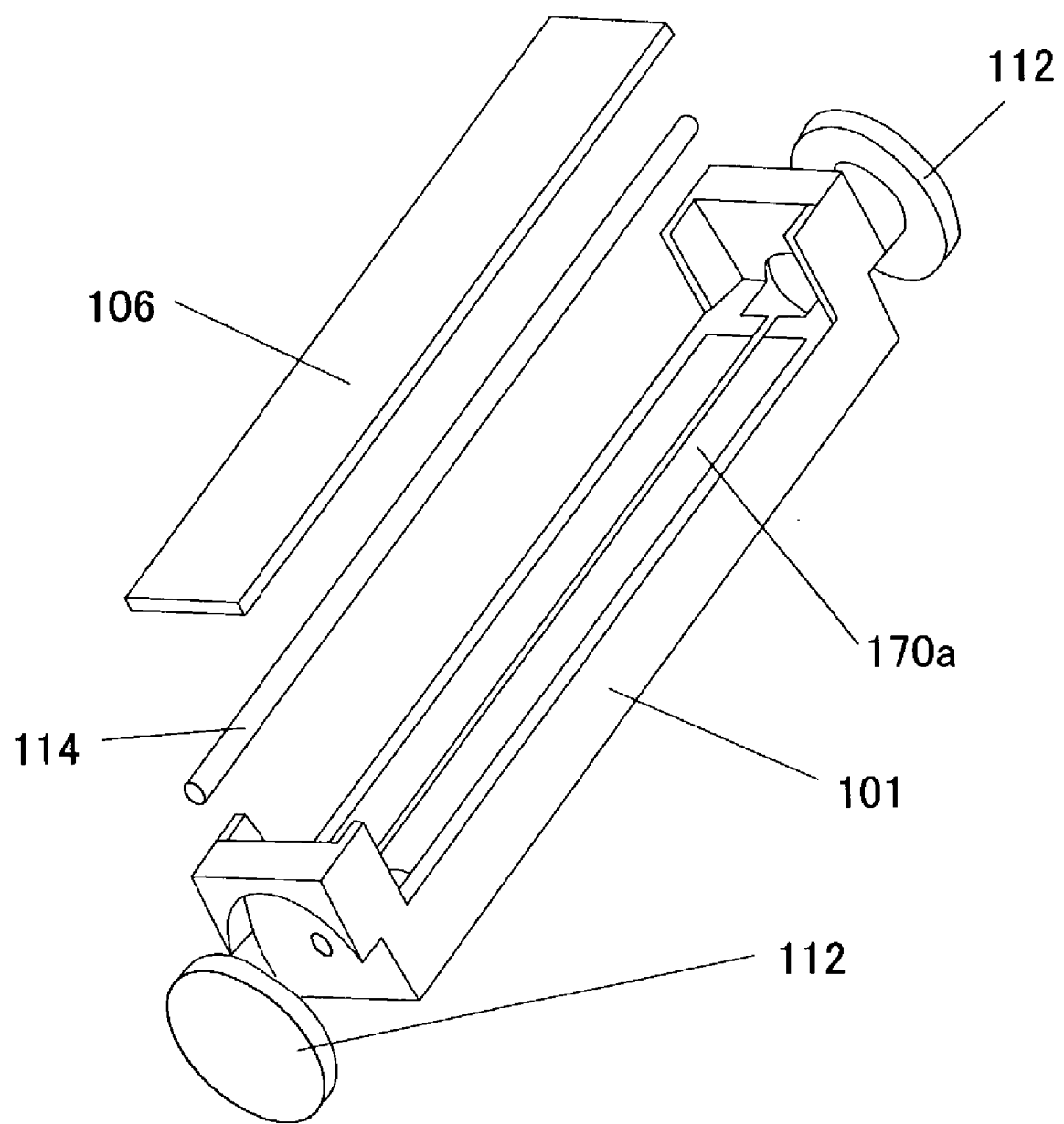
FIG. 7 is an exploded perspective view for explaining an arrangement among a housing, an image reading part, a pair of main rollers, and a shaft in the image reader shown in FIG. 1.

On the other hand, the instant embodiment arranges the main rollers 112 and image reading part 170 in series as shown in FIG. 7, while allows the shaft 114 to perforate the image reading part 170. Here, FIG. 7 is an exploded perspective view for explaining an arrangement among the housing 101, image reading part 170, main rollers 112, and shaft 114. The instant embodiment fixes main rollers 112 with the shaft 114, synchronizes the rotations of the main rollers 112, and mitigates the meander during scanning. In addition, the image reader 100 may be made smaller in the direction R than the structure shown in FIG. 15. Moreover, only one encoder is enough to measure the rotation.

Figure 5:
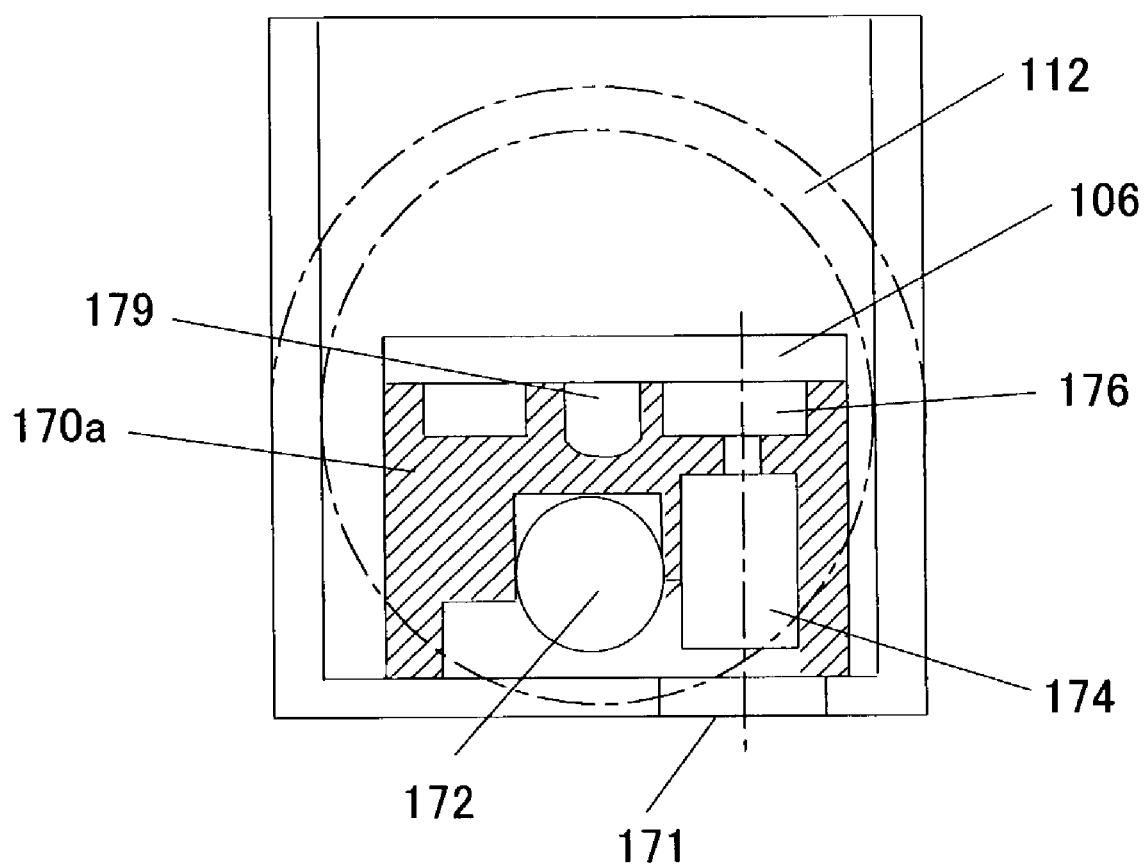
FIG. 5 is a schematic sectional view showing a structure of an image reading part in the image reader shown in FIG. 1.

As shown in FIG. 5, the shaft 114 perforates a perforation hole 179 in a unit housing 170a in the image reading part 170. If the shaft 114 does not perforates the housing 170a in the image reading part 170 and located on the housing 170a, the diameter of the roller and thus the image reader 100 become larger in the height direction HD. As a result, a position of the center of gravity becomes higher, lowering the stability of the scan movement. In addition, such a structure enlarges the moving distance per one roller rotation and requires a high-resolution rotary encoder for detecting the moving distance of the roller.

Therefore, the instant embodiment solves these problems by enabling the shaft 114 to perforate the perforation hole 179 in the image reading part 170. This structure may miniaturize a structure that arranges the roller and shaft while avoiding the image reading part 170. The shaft 114 in this embodiment has the same uniform diameter along its span. In assembling the shaft 114 inside the image reading part 170, it is conceivable to provide stages for correcting positional offsets of the rollers 112. Since the image reading part 170 is unitized, the control board 106 for the image reading part 170 should be disassembled once and then reassembled. However, this would cause the image reading part 170 to break and deteriorate its performance and it is preferable to avoid disassembly of the image reading part 170. The shaft 140 having the same diameter over its span would prevent the image reading part 170 from being disassembled since the shaft 114 may be inserted into the housing 170a from its side surface.

Figure 8:
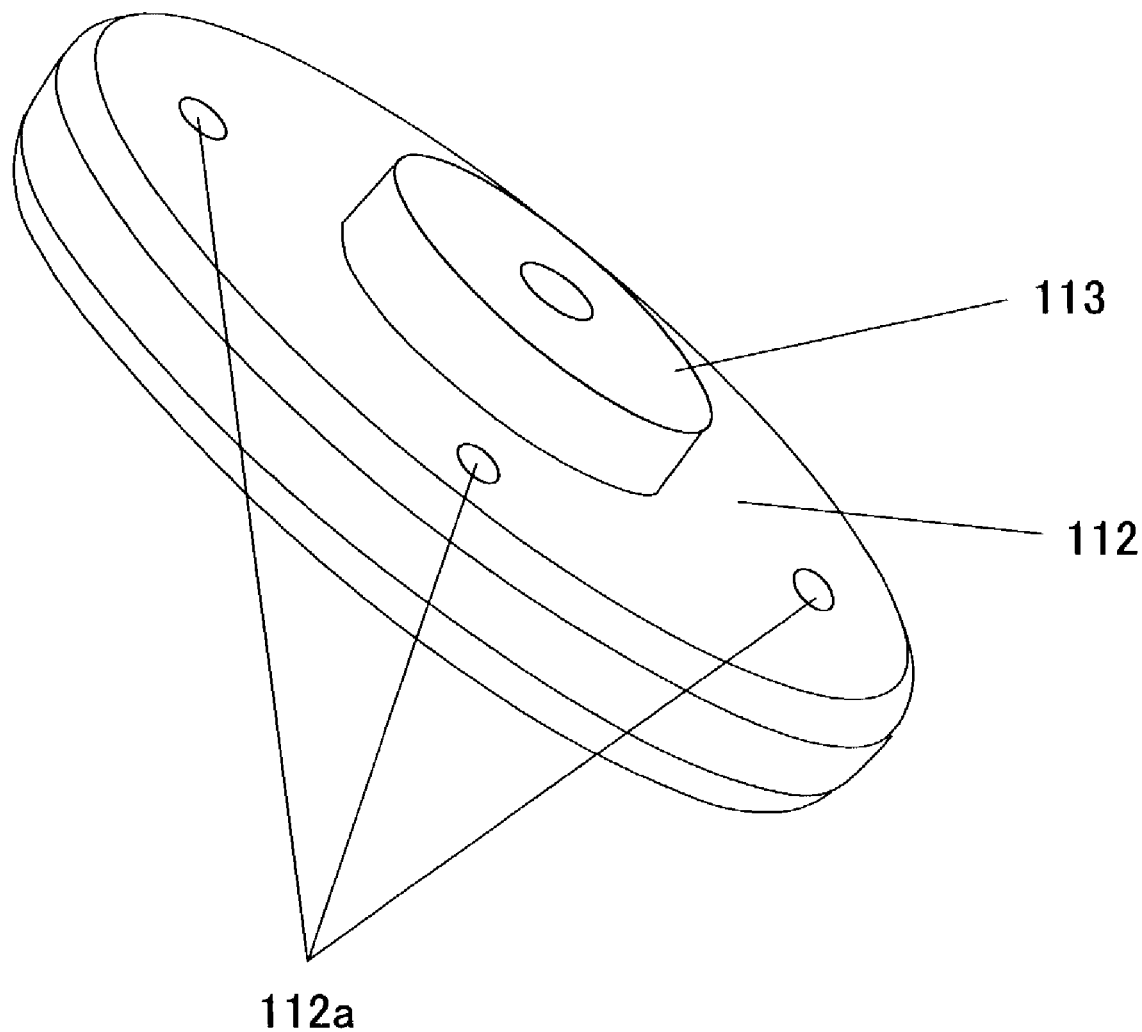
FIG. 8 is a perspective view of the main rollers in the image roller shown in FIG. 1.

Each main roller 112 has a plurality of projections 112a at the side of the housing 101, as shown in FIG. 8. Here, FIG. 8 is a perspective view of the main rollers 112. The shaft with the same diameter over its span cannot fix a position of the main roller 112 using bearings on the shaft. With the large tolerance and the large clearance among components, the roller 112 becomes rickety. The strict size enough to make small the clearance would increase cost, while the smooth rotation of the rollers 112 deteriorate due to friction resulting from a contact between the rollers 112 and housing 101. Accordingly, the instant embodiment provides a plurality of projections 112a on a surface of the main roller 112, and lowers the friction even when there is a contact between the main roller 112 and the housing 101 because the contact becomes point contacts. In addition, the clearance may be made small even in the design.

The instant embodiment provides four auxiliary rollers 116 at four corners of the image-reading surface 102, as shown in FIG. 3. While the instant embodiment arranges the main rollers 112 in the longitudinal direction LD of the image reader 100, a pair of main rollers 112 contact the medium at two points, and these two points are located just below the center line CL of the image-reading surface 102. In other words, the image-reading surface on the housing 101 may incline back and forth with respect to the line connecting two contacts between the main rollers 112 and the medium (or two points CP in FIG. 10B which will be described later). Accordingly, the auxiliary rollers 116 are provided to maintain the image-reading surface 102 parallel to the medium even when a force applies which would otherwise incline the image-reading surface.

The auxiliary rollers 116 project from the image-reading surface 102 of the housing 101 in the medium direction, for example, by 0.3 to 0.4 mm. The projecting amount of the auxiliary roller 116 from the image-reading surface 102 is made smaller than that for the main roller 112 so as to make the main roller 112 contact with the medium certainly even with somewhat manufacture errors. A provision of a plurality of auxiliary rollers 116 may facilitate maintaining the image-reading surface 102 parallel to the medium and smooth scan.

Figure 9:
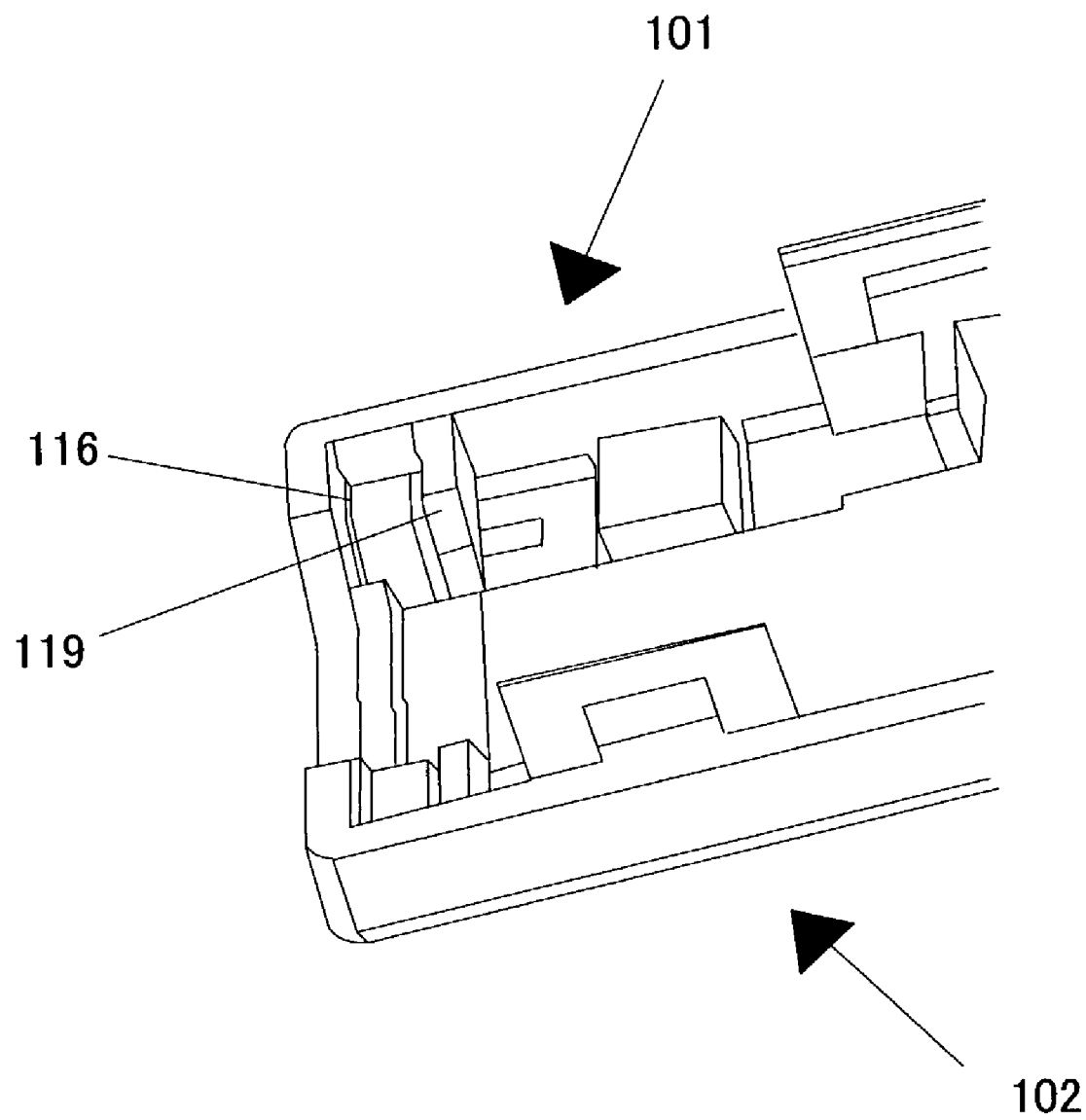
FIG. 9 is a perspective view showing a structure of an auxiliary roller in the housing in the image reader shown in FIG. 1.

The auxiliary roller 116 is made of a hollow roller and the shaft 118. The shaft 118 is accommodated in the housing 101. As shown in FIG. 9, the shaft 118 may be veiled from the outside in an assembly structure that inserts the shaft 118 into the shaft insertion opening 119 in the housing 101. Here, FIG. 9 is a perspective view inside the housing for explaining the attachment of the auxiliary rollers 116. The auxiliary rollers 116 rotate around the shaft 118. The appearance of the housing 101 may be simplified by preventing the housing 101 from exposing, and the fixture of the shaft 118 using other components would realize the simple structure.

The medium detecting part 160 is provided inside the housing 101, and is an optical system for detecting the medium, such as a book and manuscript, near the image-reading surface 102 through the detector window 161 shown in FIG. 3. The medium detecting part 160 is made of a photosensor, such as a photo-interrupter, and the detector window 161 is attached near the read window 171 in the image-reading surface 102. Although the present invention does not limit the medium detecting part 160 to the photosensor, the photosensor detects the medium in a non-contact manner and is expected to provide the image reader 100 with the longer life since there is no friction and impact with the medium associated with a mechanical switch for detecting the medium in a contact manner.

According to the medium detector part 160, a user does not have to operate the console part 12 on the PDA 10 and set the image reading part 170 to a standby state. Rather, the image reading part 170 may start and stop reading without requiring a user to release his/her hand that holds the image reader 100 and the PDA 10 on the medium.

Figure 4:
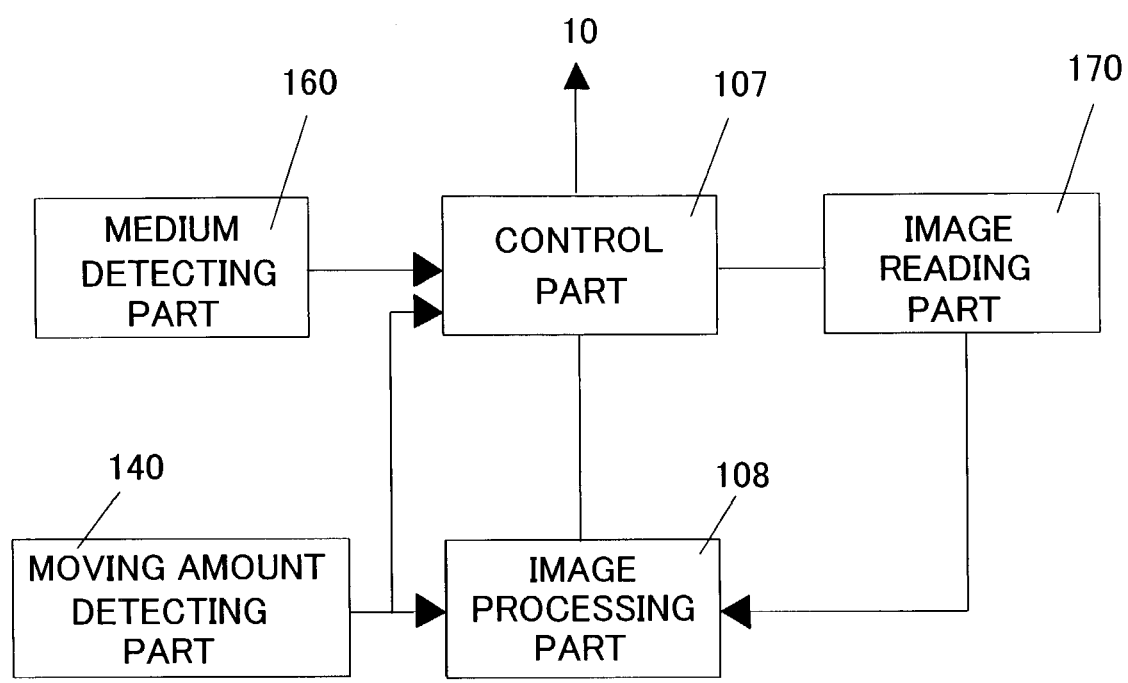
FIG. 4 is a block diagram showing a control system of the image reader shown in FIG. 4.

As shown in FIG. 4, the image reader 100 includes, as a control system, the control part 107, the image processing part 108, the moving amount detecting part 140, the medium detecting part 160, and the image reading part 170. Here, FIG. 4 is a block diagram showing a control system of the image reader 100. As described later, the moving amount detecting part 140 detects the moving amount of the image reading part 170 in the image reader 100 on the medium. The medium detector 160 outputs to the control part 107 an ON signal when detecting the medium and an OFF signal when detecting no medium. In response to a drive signal as a trigger input from the control part 107, the image reading part 170 reads in one line image on the medium and outputs this as image data to the image processing part 108. The control part 107 supplies a drive signal to the image reading part 170 in accordance with a detection result by the moving amount detecting part 140, and controls timing for reading the image by the image reading part 170. The medium detecting part 160 sends a drive signal to the image reading part 170 when receiving an ON signal from the medium detecting part 160. The image processing part 108 digitizes analog image data input from the image reading part 170. The control part 107 sends the image data processed by the image signal processing part 108 to the PDA 10, and enables the display part 14 to display the information and the console part 12 to edit the information.

The image reading part 170 is provided inside the housing 101, which is an image sensor unit for reading an image on the medium through the read window shown in FIG. 3. The image reading part 170 includes, as shown in FIG. 5, a light source 172, a lens 174, and a sensor chip 176, and is protected by the transparent protective cover 177. Here, FIG. 5 is a schematic sectional view of the housing 101 showing the structure of the image reading part 170. As shown in FIG. 5, the light source 172, lens 174, and sensor chip 176 are unitized in the housing 170a. In addition, the housing 170a includes the perforation hole 179 for the shaft 114, as described above.

Referring to FIG. 3, the read window 171 is formed in the image-reading surface 102 so that it extends in the longitudinal direction LD of the image-reading surface 102. The image reading part 170 reads an image on the medium through the read window 171. The read window 171 is formed and decentered in the forward read direction R of the image with respect to the center line CL orthogonal to the width direction WD of the image-reading surface 102 (although the center line CL in FIG. 3 does not extend to the image-reading surface 102 for illustration purposes). The CF slot is provided at the rear surface of the housing 11 for the display part 14 of the PDA 10. In scanning after the image reader 100 is inserted into the CF slot with the display part 14 facing front, the opposite end to the CF card 180 faces the read direction R of the image and is arranged at a position shown in FIG. 3. A bias of the read window 171 to the end of the image-reading surface 102 would facilitate matching the actual reading start position to the expected one, improving the operability. In other words, when the read window 171 is located at the center, a user should account for the distance between the center and the end on the image-reading surface 102. However, the end may be aligned with the image reading position in the structure shown in FIG. 3. In particular, in reading a center foldable position in a book, the image reader 100 may read a portion closer to the center of the book than that having a read window at the center in the width direction WD on the image-reading surface 102.

Figure 10A:
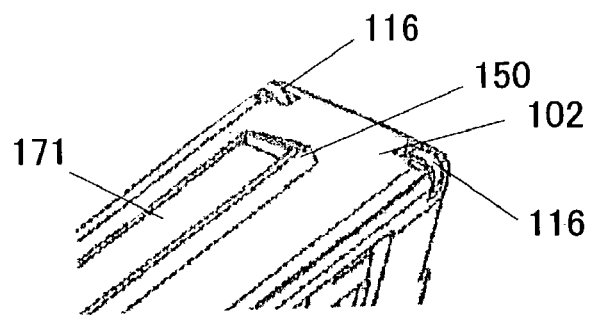
FIG. 10A is a partial perspective overview showing a projection member provided in the read window on the image reader shown in FIG. 1.
Figure 10B:
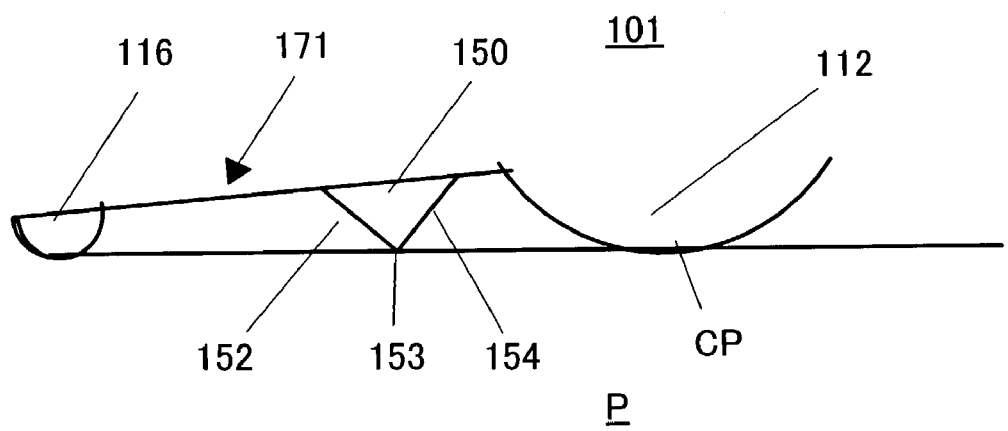
FIG. 10B is a schematic side view showing a relationship among a main roller, an auxiliary roller, and a projection roller.
Figure 10C:
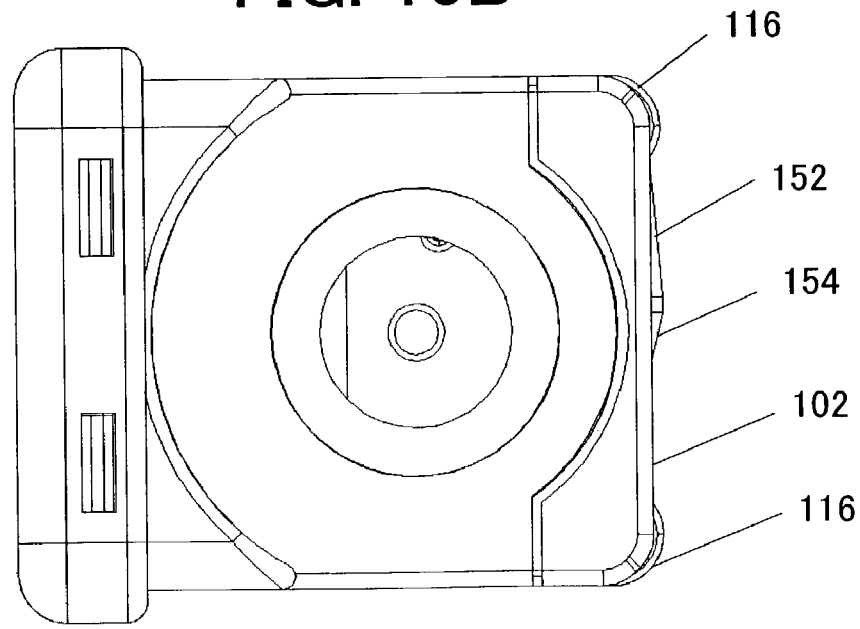
FIG. 10C is a side view of the image reader shown in FIG. 1 showing the projection member by removing the main rollers.

The read window 171 is provided with the projection member 150. A description will now be given of the projection member 150 with reference to FIG. 10. Here, FIG. 10A is a partial perspective overview of the projection member 150 provided on the read window 171. FIG. 10B is a schematic side view showing a relationship among the main roller 112, auxiliary roller 116, and projection member 150 when the image-reading surface 102 on the housing 101 inclines relative to the medium. FIG. 10C is a side view of the housing 101 without the main rollers 112 in order to show the projection member 150. FIG. 10A omits the main roller 112 for illustration purposes.

As described above, the image-reading surface 102 on the housing 101 is provided with the auxiliary rollers 116 so as to maintain parallelism since it is inclinable with respect to two points CP at which a pair of main rollers 112 contact the medium P. The points CP is located just below the centerline orthogonal to the width direction WD on the image-reading surface 102. A gap is provided between the image-reading surface 102 and the medium P for smooth rotations of the rollers 112 and 116. However, if the medium P is not maintained flat, a height of the medium P from the read window 171 changes and high quality of images cannot be obtained. Accordingly, the projection member 150 is provided near the read window 171 to compress the medium P in a read area and makes it flat. As a result, an image read by the image reading part 170 becomes a flat image, not distorted image.

The projection member 150 includes taper parts 152 and 154, and an edge line 153 between both taper parts 152 and 154 compresses the medium P. The instant embodiment arranges the contact points CP just below the centerline orthogonal to the width direction WD on the image-reading surface 102, and biases the read window 171 to the end. Without the taper parts 152 and 154, when the image-reading surface 102 inclines, the projection member close to the end contacts and hinders smooth movements of the rollers 112 and 114. Therefore, the projection member 150 is tapered to handle with the inclination of the image-reading surface 102.

A transparent protective cover 177 is attached to the read window 171. The light source 172 is provided obliquely near and above the read window 171, and irradiates illumination light onto the medium through the read window 171. The light source 172 is made, for example, of a light-emitting diode and cold-cathode tube. The lens 174, which is provided above the read window 171, condenses, through the transparent protective cover 177, the reflected light from the medium that reflects the light from the light source 172. The sensor chip 176 includes a plurality of line sensors arranged along a straight line including an image sensor (e.g., a charge-coupled device) and a CMOS sensor, and reads one line of image data on the medium. The sensor chip 176 is provided above the lens 174, and output as image data for each line the reflected light condensed by the lens 174 that has been converted into an electronic signal. The sensor chip 176 is provided on the control board 106 onto which the control part 107 and the image processing part 108 are mounted.

The transparent protective cover 177 is attached to cover the read window 171, and shields the housing 101 from dust, protecting the optical system elements, such as the lens 174.

The perforation hole 179 is provided at the side of the board 106 in the housing 170a, which is a groove-shaped housing component that does not cause the molding manufacture complex. Since it uses a dead space above the light source or light guide member 172, it does not shield an optical path in the optical system. A unit of the housing 172a may be assembled and inspected as a single member without assembling the shaft 114 by the same procedure as a type that does not perforate the shaft. The size of the component usually has tolerance to account for the manufacture error, but the assembly conceivably creates an aperture that causes the roller 112 to be rickety in the longitudinal direction LD. In order to prevent this, a shaft often includes steps at a bearing portion in the roller 112 to position the roller 112 relative to the housing 101. However, the step would require the board 106 to be removed and assembled, and the image reading part 170 is required to be inspected and adjusted. The structure of this embodiment improves the operability by eliminating the re-inspection and readjustment of the image reading part 170.

The CF card 180 is an interface that enables the housing 101 as a scanner part to be mounted onto the PDA 10. A description will now be given of the board arrangement with reference to FIG. 14. Here, FIG. 14A is a perspective view showing an arrangement between the board 181 in the CF card 180 and the control board 106. FIG. 14B is its sectional view. FIG. 14C is a schematic plane view for explaining a connection part with a connector formed on the control board 106. FIG. 14 is a view for explaining an embodiment that improves operability by lowering the height of the image reader 100.

An input device that does not contact the medium, such as a camera, does not affect operability even when this increases the height of the PDA 10 where an interface part of the PDA 10 projects from the end of the information processor and its top is mounted with a camera part for inputting an image. On the contrary, the image reader 100 that contacts the medium and has the large height of the housing 101 in the direction HD shown in FIG. 3 would shift up the center-of-gravity position, lowering the stability when the image reader 100 moves for scanning. Accordingly, the instant embodiment provides the board 181 with the connector 182 in the CF card 180 and the control board with the connection part 106 connectible with the connector 182 as shown in FIG. 14C, thereby connecting the board 181 and 106 perpendicular to each other, as shown in FIG. 14B. Such an L-shape connection would lower the height of the housing 101 and thus the center-of-gravity position while maintaining the mountable area, thereby stabilizing the scan movement and operability of the image reader 100.

Figure 11:
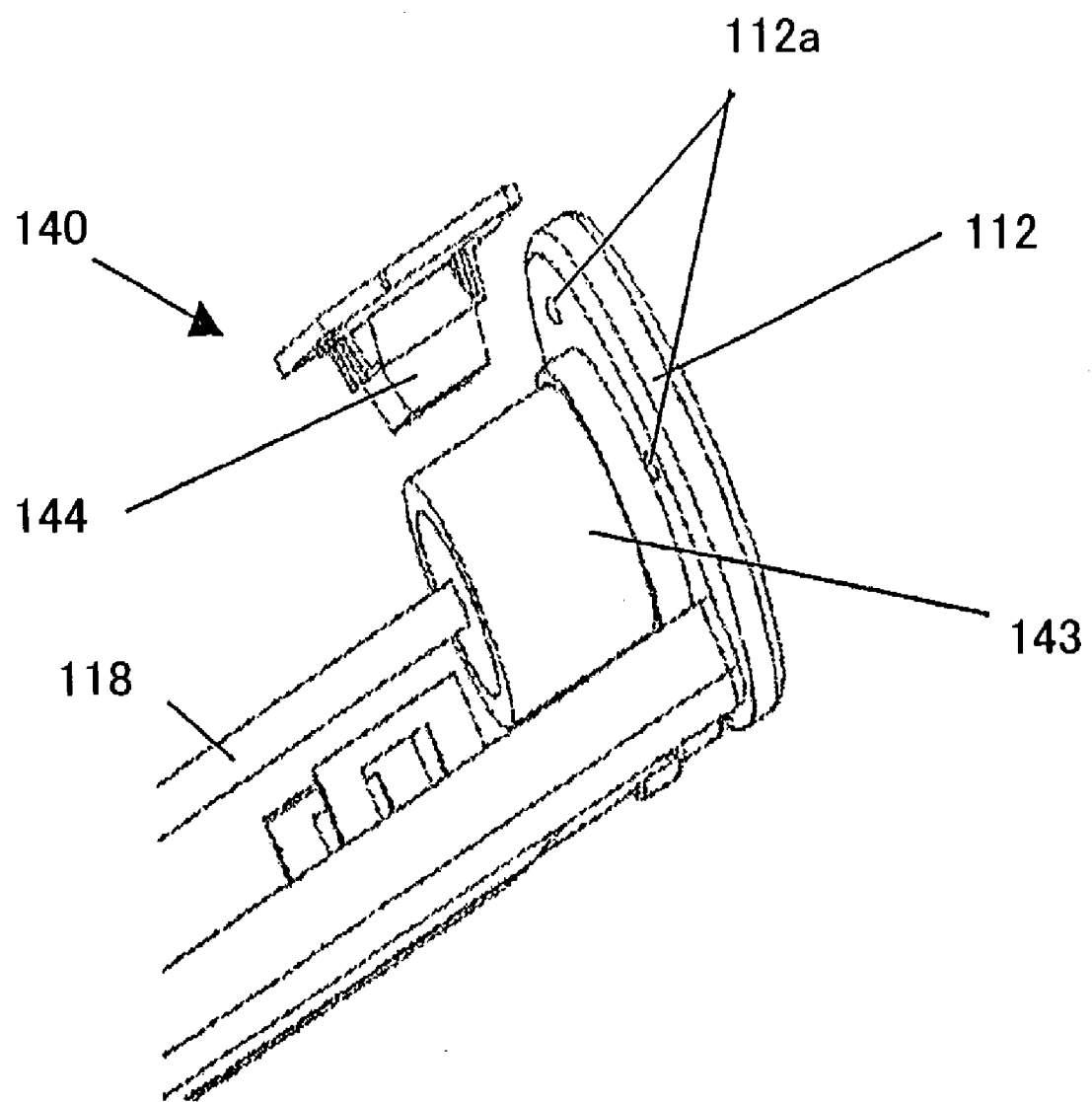
FIG. 11 is a perspective view showing an exemplary structure of a movement amount detection part of the image reader shown in FIG. 1.

A description will now be given of the moving amount detecting part 140 with reference to FIG. 11. Here, FIG. 11 is a perspective view for explaining the moving amount detecting part 140. The moving amount detecting part 140 detects the moving amount of the image reader 100 by detecting the moving amount of the main roller 112, and is implemented as a rotary encoder in this embodiment. The moving amount detecting part or rotary encoder 140 includes a scaler 142, and an optical detecting part 144. The scaler 142 has a hollow cylinder shape or ring shape engaged with the shaft 114, and includes a plurality of lines 143 patterned at a regular interval on the side curved surface. The optical detecting part 144 includes a light emitting element and a light receiving element in the package, and made of an optical reflection-type sensor for irradiating light onto an object and for recognizing the reflected light from the object.

Figure 12:
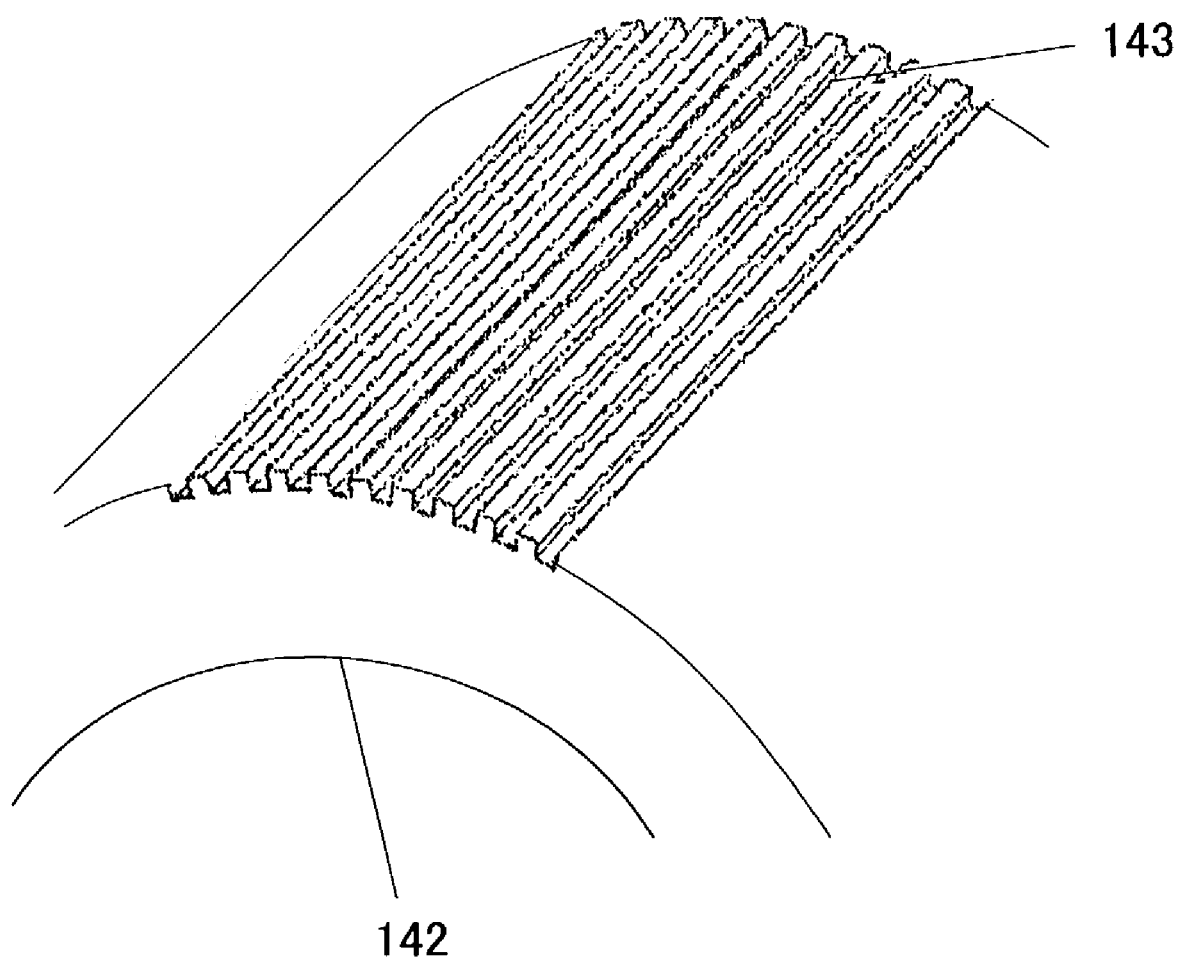
FIG. 12 is an enlarged perspective view of a surface on a scaler in the movement amount detection part shown in FIG. 11.

The rotary encoder often includes a photo-interrupter and a slit plate, but the slit plate having plane slits requires a step of physically perforating the slits. A slit center diameter becomes smaller than the diameter of the slit plate so as to provide the radial slits. However, in using a reflection-type photosensor as shown in FIG. 12, the side surface of the cylinder may form the patterned slits on the outer circumference. This may increase the number of lines and improves the resolution. Here, FIG. 12 is an enlarged perspective view for explaining lines 143 patterned on a surface of the scaler 142.

The patterning process for manufacturing the scaler 142 of the instant embodiment may use etching, laser processing, etc. In the inventive structure, it is preferable that the diameter of the main roller 112 is smaller than that of the scaler 142 so that the patterned surface does not damage the patterned lines 143 as a result of contact with the manuscript. When the main roller 112 is combined with the scaler 142, there is a step between the roller 112 and the scaler 142 which makes difficult the patterning process. Accordingly, the scaler 142 is separated from the roller 112 and attached to the shaft 114 after processed into a hollow cylinder or ring shape. The hollow cylinder or ring shape enables the scaler 142 to be mounted on the boss part 113 of the main roller 112. As a result, the scaler is easily combined with the main roller. In the operation of the moving amount detecting part 140, the scaler 142 rotates and the sensor 144 stands still.

The scaler 142 is adapted to be fixed onto the shaft 114 and to rotate with the shaft 114 and the main rollers 112. The rotation of the main roller 112 may be transmitted directly to the scaler 142. This structure simplifies the structure of the encoder.

Figure 13:
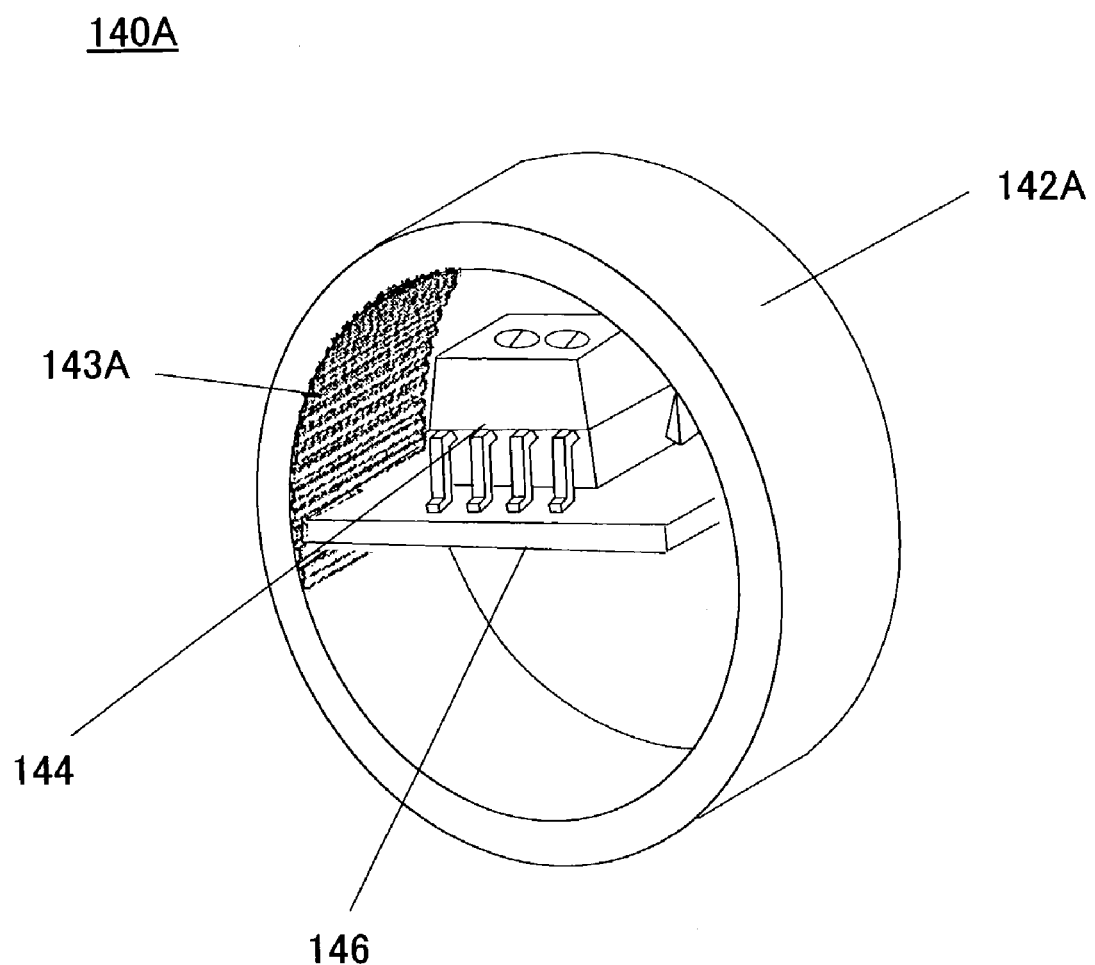
FIG. 13 is a perspective view showing a variation of the movement amount detection part shown in FIG. 11.

Referring to FIG. 13, a description will be given of the moving amount detecting part 140A as a variation of the moving amount detecting part shown in FIG. 11. The moving amount detecting part 140A includes a scaler 142A, a sensor 144, a board 146 that serves to support the sensor 144. The scaler 142A has a hollow ring shape, and is different from the scaler 142 in that it forms patterned lines 143A on the ring inner surface. The scaler 142A may be formed by a counter boring, and patterned on its inner circumference. The sensor 144 is arranged at the hollow part in the scaler 142A through the board 146 that serves to support the sensor 144. The component mount density improves in the device by arranging the sensor 144 in a cavity portion of the scaler 142A, and the moving amount detecting part 140A and image reader 100 maybe made small. In operation, the scaler 142A rotates and the sensor 144 stands still similar to the moving amount detecting part 140.

A description will now be given of the operation of the image reader 100. The control part 107 determines whether the console part 12 on the PDA 10 has been operated or the medium detecting part 160 has detected the medium. The operation of the console part 12 is an activation for setting the image reading part 170 to a readable state. The control part 107 does not run the image reading part 170 until it determines that the console part 12 on the PDA 10 has been operated or the medium detecting part 160 has detected the medium. When the control part 107 determines that the console part 12 on the PDA 10 has been operated or the medium detecting part 160 has detected the medium, the control part 107 runs the image reading part 107 after designating (or setting up) the number of lines in the image data to be read. Here, the number of lines means the number of lines in the scan or read direction R of the image reader 100 on the paper, and a readable area by the image reader 100 corresponds to the number of lines multiplied with a width in the longitudinal direction of the image read window 101b.

The former case would be implemented in a PDA of such a device type that arranges the console part 12 above the display part 14 or in the PDA that arranges the console part 12 under the display part 14 but is low. The latter case is implemented when the medium detection signal or ON signal is transmitted from the medium detecting part 160 to the control part 107. The instant embodiment thus enables the image reading part to be set to an automatic readable state as a result of a detection of the medium by the medium detecting part 160, and the user thus does not have to operate the console part 12 and feels improved operability when the holding part at which the user holds the PDA 10 and the image reader 100 shown in FIG. 2 is apart from the console part 12.

Then, a user starts reading an image on the medium, such as a book or manuscript, by approaching the end of the housing 101 of the image reader 100 to the reading start position. As shown in FIG. 10B, the image-reading surface 102 slightly inclines relative to the medium with respect to a line connecting the contact points CP between a pair of main rollers 112 and the medium, but the auxiliary rollers 116 prevent great inclination. In addition, the projection member 150 makes the medium flat near the read window 171, and maintains the quality of images to be read. The read window 171 may easily read images near the center part in a foldable book since the read window 171 is biased to the end on the image-reading surface 102 in the scan direction R. As shown in FIG. 5, the image reading part 170 has the perforation hole 179 through which the shaft 114 perforates, and the boards 106 and 181 are connected perpendicularly or like an L-shape, as shown in FIG. 14, the height of the housing 101 and thus the center-of-gravity are maintained to be low and the scan movement of the housing 101 is stabilized. The main rollers 112 point-contact the side surface 103 of the housing 101 and causes small friction enough to maintain the smooth movement, as shown in FIG. 8. In addition, such a structure may make the clearance small between the main roller 112 and the housing 101, and prevents the unstable scan movement of the main roller 112. The reinforcing member 198 shown in FIG. 6 that is inserted as required prevents the binding stress to apply to the CF card 180 between the housing 101 and the PDA 10 during the scan movement.

Since a pair of main rollers 112 are connected to the shaft 114, their rotations are synchronized and the shaft 114 is connected to the scaler 142. The moving amount of the image reader 100 is detected with precision by the scaler 142 having high resolution in the moving amount detecting part 140.

The control part 107 sequentially outputs a read control signal to the image reading part 170 at a predetermined period. The read control signal may be prepared by utilizing the detection result by the moving amount detecting part 140. The image reading part 170 outputs to the image processing part 108, image data for one line on the medium and the detection result by the moving amount detection part 140 for each input of the read control signal. The image data is digitized by the image processing part 108 and input in the control part 107. The control part 107 transmits data for every one or several lines to the PDA 10, and enables a memory (not shown) to store the data, the display part 14 to display the data, and/or the console part 12 to edit the data.

Then, the control part 107 determines whether the console part 12 on the PDA 10 has been operated or the medium detecting part 160 does not detect the medium. The operation of the console part 12 means the operation for stopping reading by the image reading part 170. The control part 107 allows the image reading part 170 to continue to read the medium until the console part 12 on the PDA 10 has been operated or the medium detecting part 160 does not detect the medium. As described above, according to the instant embodiment, a user does not have to operate the console part 12 and feels improved operability in the latter case, because the OFF signal is sent from the medium detecting part 160 to the control part 107 to automatically stop reading by the image reading part 170. More specifically, the user simply heaves the image reader 100 from the medium, whereby the control part 107 instructs the image reading part 170 to automatically finish the image reading action.

As discussed, since the image reader of the instant embodiment adapts the image reader 180 to start and stop reading automatically based on a medium detection result by the medium detecting part 160 that serves as an optical switch, a user does not have to operate the console part 12 on the PDA and feels improved operability of the device.

Further, the present invention is not limited to these preferred embodiments, and various modifications and changes may be made in the present invention without departing from the spirit and scope thereof. For example, the PDA 10 of this embodiment has a CF slot, the PDA 10 may be connected to an external unit having a CF slot instead of providing the PDA 10 itself with the CF slot. In this case, the PDA 10 may be fixed onto this external unit mechanically through screws etc., or connected electrically. The CF card 180 may be inserted into the external unit and adapted to electrically communicate with the PDA 10 when the external unit is used.

Thus, the present invention may provide an image reader having good operability.

What is claimed is:

1. An image reader, detachably attached to an electronic apparatus, for functionally expanding the electronic apparatus and for reading an image on a medium, said image reader comprising:
    an interface connectible to and disconnectible from the electronic apparatus;
    a housing having an image-reading surface that is to face the medium;
    a medium detecting part, provided on the image-reading surface, for detecting the medium;
    an image reading part, provided on the image-reading surface and driven based on a detection result by said medium detecting part, for reading the image on the medium; and
    a reinforcing member detachably provided between said housing and the electronic apparatus, and made of an elastic material.

2. An image reader according to claim 1, wherein the medium detecting pad is an optical switch for driving said image reading part.

3. An image reader according to claim 1, wherein said image reading part reads the image through a read window formed on the image-reading surface extending in a longitudinal direction of the image-reading surface, the read window being formed and decentered in a forward read direction of the image on the image-reading surface.

4. An image reader according to claim 1, further comprising:
    a first base for forming said interface; and
    a second base, fixed perpendicular to said first base, for forming said image reading part.

5. An image reader, detachably attached to an electronic apparatus, for functionally expanding the electronic apparatus and for reading an image on a medium, said image reader comprising:
    an interface connectible to and disconnectible from the electronic apparatus;
    a housing having an image-reading surface that is to face the medium;
    a medium detecting part, provided on the image-reading surface, for detecting the medium;
    an image reading part, provided on the image-reading surface and driven based on a detection result by said medium detecting part, for reading the image on the medium; and
    a plurality of reinforcing members to be detachably provided between said housing and the electronic apparatus and made of an elastic material, each reinforcing member having a different width in a direction from said housing to the electronic apparatus, wherein one of said plurality of reinforcing members which fits an interval between said housing and the electronic apparatus being selected and inserted between said housing and the electronic apparatus.

6. An image reader, detachably attached to an electronic apparatus, for functionally expanding the electronic apparatus and for reading an image on a medium, said image reader comprising:
    an interface connectible to and disconnectible from the electronic apparatus;
    a housing having an image-reading surface that is to face the medium;
    a medium detecting part, provided on the image-reading surface, for detecting the medium;
    an image reading part, provided on the image-reading surface and driven based on a detecting result by said medium detecting part, for reading the image on the medium;
    a pair of main rollers rotatably provided on side surfaces perpendicular to the image-reading surface on said housing; and
    an auxiliary roller attached to said image-reading surface.

7. An image reader according to claim 6, further comprising a shaft, accommodated in said housing, for pivoting said auxiliary roller.

8. An image reader, detachably attached to an electronic apparatus, for functionally expanding the electronic apparatus and for reading an image on a medium, said image reader comprising:
    an interface connectible to and disconnectible from the electronic apparatus;
    a housing having an image-reading surface that is to face the medium;
    a medium detecting part, provided on the image-reading surface, for detecting the medium; and
    an image reading part, provided on the image-reading surface and driven based on a detection result by said medium detecting part, for reading the image on the medium
    wherein said image reading part includes a read window formed on the image-reading surface extending in a longitudinal direction of the image-reading surface, and
    wherein said image reader further comprises:
    a pair of main rollers rotatably provided in said housing; and
    a projection member, provided on the image-reading surface, for correcting distortion of the medium, said projection member inclining in a forward read direction of the image.

9. An image reader, detachably attached to an electronic apparatus, for functionally expanding the electronic apparatus by providing the electronic apparatus with an image reading function, and for reading an image on a medium, said image reader comprising:
    a housing having an image-reading surface that is to face the medium;
    an image reading part, provided on the image-reading surface, for reading the image on the medium;
    a pair of main rollers rotatably provided on a pair of side surfaces perpendicular to the image-reading surface on said housing; and
    a shaft, provided in said housing, for connecting said pair of main rollers,
    wherein said shaft perforates the image reading part.

10. An image reader according to claim 9, wherein said shaft has the same uniform diameter in a longitudinal direction.

11. An image reader according to claim 10, wherein said main roller includes a plurality of projections at a side of said housing.

12. An image reader according to claim 9, further comprising an auxiliary roller attached to the image-reading surface on said housing.

* * * * *

UNITED STATES PATENT AND TRADEMARK OFFICE
CERTIFICATE OF CORRECTION

| | | |
|---|---|---|
| PATENT NO. | : 7,362,477 B2 | Page 1 of 1 |
| APPLICATION NO. | : 10/445023 | |
| DATED | : April 22, 2008 | |
| INVENTOR(S) | : Yoshiro Ishikawa et al. | |

It is certified that error appears in the above-identified patent and that said Letters Patent is hereby corrected as shown below:

Column 15, Line 22, change "pad" to --part--.

Signed and Sealed this

Thirtieth Day of September, 2008

JON W. DUDAS
*Director of the United States Patent and Trademark Office*